(12) United States Patent
Schwartz Franceschini et al.

(10) Patent No.: US 10,309,064 B2
(45) Date of Patent: Jun. 4, 2019

(54) APPLIED TO CHASIS OF MOBILE ASPHALT PLANTS

(71) Applicant: CIBER EQUIPAMENTOS RODOVIARIOS LTDA, Porto Alegre (BR)

(72) Inventors: Andre Schwartz Franceschini, Porto Alegre (BR); Guilherme Luiz Piccoli, Porto Alegre (BR)

(73) Assignee: Ciber Equipamentos Rodoviarios LTDA, Porto Alegre (BR)

( * ) Notice: Subject to any disclaimer, the term of this patent is extended or adjusted under 35 U.S.C. 154(b) by 0 days.

(21) Appl. No.: 15/579,607

(22) PCT Filed: Jun. 3, 2016

(86) PCT No.: PCT/BR2016/050124
§ 371 (c)(1),
(2) Date: Dec. 5, 2017

(87) PCT Pub. No.: WO2016/191843
PCT Pub. Date: Dec. 8, 2016

(65) Prior Publication Data
US 2018/0155881 A1 Jun. 7, 2018

(30) Foreign Application Priority Data
Jun. 5, 2015 (BR) .......................... 2020150132161

(51) Int. Cl.
*E01C 19/08* (2006.01)
*E01C 19/10* (2006.01)
(Continued)

(52) U.S. Cl.
CPC .............. *E01C 19/08* (2013.01); *B28C 7/061* (2013.01); *B28C 9/0427* (2013.01); *B60P 3/00* (2013.01);
(Continued)

(58) Field of Classification Search
CPC ...... E01C 19/08; E01C 19/10; E01C 19/1054; E01C 2019/1081; B28C 7/04; B28C 7/061; B28C 9/0427
(Continued)

(56) References Cited

U.S. PATENT DOCUMENTS 2,805,052 A * 9/1957 Preeman .............. E01C 19/1009
198/632
2,945,683 A * 7/1960 Martinson ........... E01C 19/1009
366/22
(Continued)

FOREIGN PATENT DOCUMENTS

BR 8300818 2/2005
BR 8401953 3/2006
(Continued)

Primary Examiner — Raymond W Addie
(74) Attorney, Agent, or Firm — Bay State IP, LLC

(57) ABSTRACT

An improvement to a chassis for mobile asphalt plants consists in modularizing the design of the chassis in order to reduce design time and storage costs by virtue of a standardization of the chassis. Thus, the solution fits asphalt plants of different sizes and reduces the physical space required to store items belonging to the structure of the chassis. The high level of standardization has been achieved by segmenting the main structure of the chassis into three regions which appropriately accommodate all of the systems for producing the asphalt mixture.

3 Claims, 3 Drawing Sheets

(51) Int. Cl.
  *B28C 7/06* (2006.01)
  *B28C 9/04* (2006.01)
  *B60P 3/00* (2006.01)
(52) U.S. Cl.
  CPC .......... *E01C 19/10* (2013.01); *E01C 19/1054* (2013.01); *E01C 2019/1081* (2013.01)
(58) Field of Classification Search
  USPC .................................... 404/79–81, 101, 108
  See application file for complete search history.

(56) References Cited

U.S. PATENT DOCUMENTS

| | | | | |
|---|---|---|---|---|
| 3,690,039 | A * | 9/1972 | Salemink | B01D 46/18 55/421 |
| 3,905,587 | A * | 9/1975 | Preeman | E01C 19/1009 366/25 |
| 4,174,181 | A * | 11/1979 | Garbelman | E01C 19/1036 366/2 |
| 4,249,848 | A * | 2/1981 | Griffin | B65D 88/30 414/332 |
| 4,337,014 | A * | 6/1982 | Farnham | E04H 7/30 414/332 |
| 5,083,870 | A * | 1/1992 | Sindelar | E01C 19/10 34/137 |
| 5,620,249 | A * | 4/1997 | Musil | B28C 5/4282 34/136 |
| 6,186,654 | B1 * | 2/2001 | Gunteret, Jr. | B01F 5/265 366/18 |
| 6,280,073 | B1 * | 8/2001 | Dillman | E01C 19/10 366/25 |
| 9,566,557 | B2 * | 2/2017 | Huh | B01F 9/001 |
| 9,644,329 | B2 * | 5/2017 | Mollick | E01C 19/1004 |
| 2008/0256878 | A1 * | 10/2008 | Berns | E04B 1/3444 52/79.6 |
| 2014/0119829 | A1 * | 5/2014 | Eliot | E01C 23/065 404/113 |
| 2018/0135256 | A1 * | 5/2018 | Schwartz Franceschini | E01C 19/10 |

FOREIGN PATENT DOCUMENTS

| | | |
|---|---|---|
| EP | 1982813 | 10/2008 |
| KR | 100682605 | 2/2007 |
| KR | 10091663 | 9/2009 |

* cited by examiner

APPLIED TO CHASIS OF MOBILE ASPHALT PLANTS

CROSS REFERENCE TO RELATED APPLICATION

This application is for entry into the U.S. National Phase under § 371 for International Application No. PCT/BR2016/050124 having an international filing date of Jun. 3, 2016, and from which priority is claimed under all applicable sections of Title 35 of the United States Code including, but not limited to, Sections 120, 363, and 365(c), and which in turn claims priority under 35 USC 119 to Brazilian Patent Application No. 2020150132161 filed on Jun. 5, 2015.

TECHNICAL FIELD OF THE INVENTION

Generally, the present utility model pertains to the technical field of equipment for producing Hot Mix Asphalt (HMA) and relates more particularly to an improvement applied to a chassis of mobile asphalt plants with external or internal mixture.

KNOWN STATE OF THE ART

Currently the use of mobile asphalt plants is a major technological breakthrough in the asphalt industry. The demand for such mainly derives from the need to move these mobilities in a short timeframe, streamlining the production process without overspending on cargo transport. Thus, by coupling the mobile asphalt plant to a road tractor, this equipment can be easily transported and later installed.

The chassis of mobile asphalt plants, in addition to accommodating the subsystems responsible for processing Hot Mix Asphalt (HMA) should also incorporate vehicle items that are indispensable for the transport of the plant and which allow for correct circulation. Elements such as axles, brakes, suspension, king pin, and the like, fifth wheel, among others, are essential for the transportation of the asphalt plant. Further, the dimensions employed and the loadings to which the chassis will be subjected must comply with national and international transit legislations.

In mobile asphalt plants, the subsystems responsible for manufacturing the Hot Mix Asphalt (HMA) must be provided fully over the vehicle chassis, so the size and the weight of the components are directly connected to the equipment size. The size of the equipment is directly related to the production rate of hot mix asphalt that the plant can produce. A broad and diversified portfolio of equipment must require that the chassis be constituted of different shapes and that different beam sizes are developed. Accordingly, each chassis must have, in its design structure, different sub-items (beams) enabling the subsystems of varied sized plants to be accommodated. Therefore, it is clear that there is a low level of standardization in chassis designs known on the market today.

Among the alternatives comprising chassis of mobile asphalt plants, it is possible to cite the most common models that comprise just one chassis without subdivisions. We can mention, for example, utility model MU 8201924-0, which has a constructive arrangement in hot asphalt plants wherein all the manufacturing components are interconnected on a single chassis. Other alternatives are Korean patents KR100916636 and KR100682605. Patent KR100916636 describes a plant arrangement on a chassis designed to facilitate installation of the plant on the vehicle and at the site of use, whereas patent KR100682605 presents just one whole chassis in its arrangement.

Utility model MU 8902008-1 comprises an arrangement somewhat different to the examples cited above, since the proposed asphalt plant is provided with two independent modules that allow and facilitate assembly of the plant at different angles. The first module is formed by dosing silos connected to a drum dryer and mixer, while the second module accommodates the filtration and exhaust systems, as well as the command cabin itself.

Since mobile asphalt plants are produced in series, and taking into account the existence of different size plants, there is an obvious drawback in the chassis currently offered on the market. The current state of the art only has chassis developed to accommodate the plant for which it was developed, it being unfeasible to use the same chassis if the need arises to transport a larger mobile plant. This low level of standardization results in the need for large physical spaces for accommodating these materials that make up the various chassis needed. Another difficulty inherent to the high number of sub-items is the management by the supply sector, this sector being in charge of controlling the acquisition of countless items for different equipment. Therefore, mismanagement of the chassis items may trigger delays in the completion and delivery of plants, adversely affecting the planning of the end customer.

In view of all the drawbacks existing in chassis for transporting mobile asphalt plants currently used, there is a clear gap for creating a solution that comprises a standardized chassis and that is designed to reduce the space needed to store the sub-items belonging to the chassis structure.

NOVELTIES AND OBJECTIVES OF THE INVENTION

With a view to filling the gaps in the current state of the art, the present utility model provides a solution relating to the arrangement of chassis of mobile asphalt plants that allows a large portfolio of equipment to be encompassed. So, the solution in question provides for the chassis arrangement such that they encompass all types of existing asphalt plants, having varied sizes.

The present solution consists of an improvement applied to the chassis of mobile asphalt plants using subdivision of areas on the chassis itself. The novelty consists of a modularization in the chassis design to reduce the design time and storage costs by implementation the standardization thereof, reducing the physical spaces required for storing the items belonging to the chassis structure.

The high level of standardization is obtained by segmenting the main structure of the chassis into three distinct regions that suitably allocate all the systems responsible for producing the final mixture. Additionally, another subdivision is made in the region having the chassis towing axles, this being further subdivided into two segments used in accordance with the size of the plant. This region accommodates the filtration system and the equipment for exhaust the combustion gases and water vapor. In turn, the central region of the chassis comprises the mixing system, the drying/heating system, the gas exhaust duct and the final mixture unloading system. And finally, the last region should compulsorily accommodate the king pin region for small and medium-sized plants, and should also contain the dosing system.

DESCRIPTION OF THE ACCOMPANYING DRAWINGS

In order for the present utility model to be fully understood and carried out by any skilled person from this technical field, it will be described in a clear, concise and sufficient manner, based on the accompanying drawings which illustrate and support it, as listed below:

DETAILED DESCRIPTION OF THE INVENTION

Figure 1:
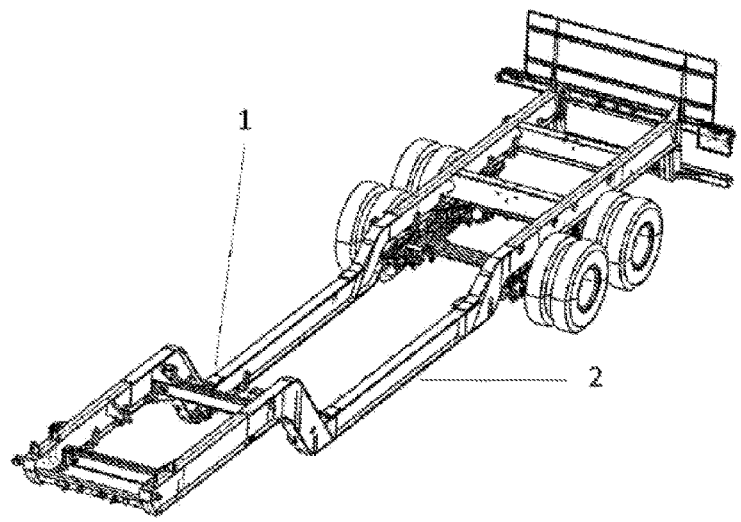
FIG. 1 shows a perspective view of the chassis of mobile asphalt plant highlighting its two main structures.
Figure 2:
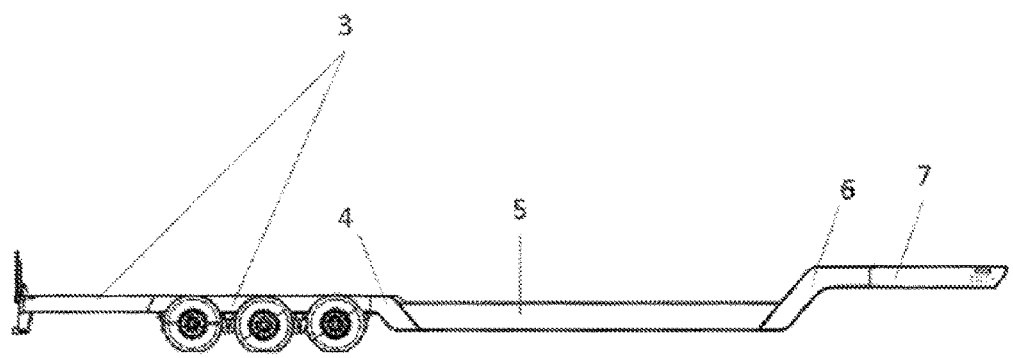
FIG. 2 shows a side view of the subdivision of the main structures of the chassis in three distinct regions joined by transition structures.

The present utility model discloses a solution for standardizing the chassis of mobile asphalt plants, the creation of a modularization of the chassis in three regions, in which all operating subsystems of the plant will be properly arranged. FIG. 1 shows the main frame of the vehicle chassis of an asphalt plant, which essentially consists of two identical main structures (1) (2). This main structure configures the region with greater mass and length of the chassis. That is, the gain in space and logistics will be more effective if we act directly on these two structures.

In light of this fact, and as part of the solution that is the object of this specification, a concept has been developed that conferred the high level of standardization desired based on the segmentation of both main structures into three distinct regions (3) (5) (7). These three regions are separated by two transitions, also known as "necks". The rear transition (4) joins the rear segment (3) to the center segment (5) of the plant and the front transition (6) connects the center segment (5) to the front segment (7). The union between the segments (8), (9), (10), (11) and (12) may be carried out by welding or through screws.

Accordingly, the first step in the solution, in order to raise the level of standardization, was to identify which segments of the main chassis should accommodate the systems responsible for producing the hot mix asphalt. A study was carried out because the mobile equipment developed for manufacturing the Hot Mix Asphalt (HMA) should have the following elements: a king pin region for transporting the plant, a dosage system, a drying/heating system, a gas exhaust duct, a gas exhaust system, a filtration system, a mixing system and an unloading region for the final mix.

Figure 3:
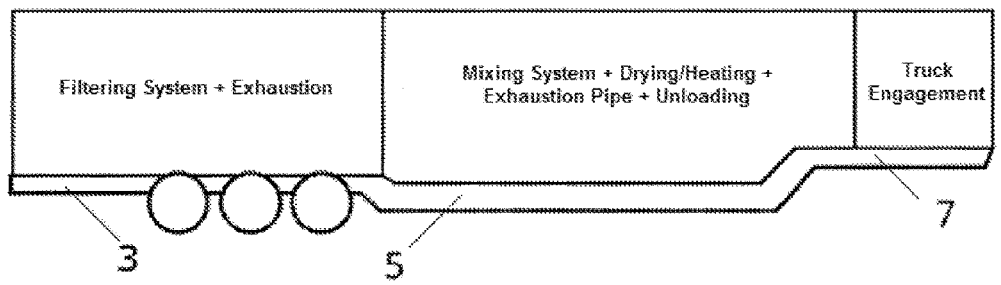
FIG. 3 shows a side view of the arrangement applied to the chassis for implementation in large plants.

FIG. 3 proposes and illustrates the process of modularizing the arrangement of the systems described, when applying the present solution to large mobile asphalt plants. The arrangement of the large mobile plant will contain in its rear segment posterior (3) the filtration system required for controlling emissions in an asphalt plant and the equipment responsible for the exhaustion of the combustion gases and water vapor. The center segment (5) accommodates the mixing system, the drying/heating system, the gas exhaust duct and the unloading of the mix. Lastly, the front segment (7) of large plants is comprised by the connecting device (king pin).

Figure 4:
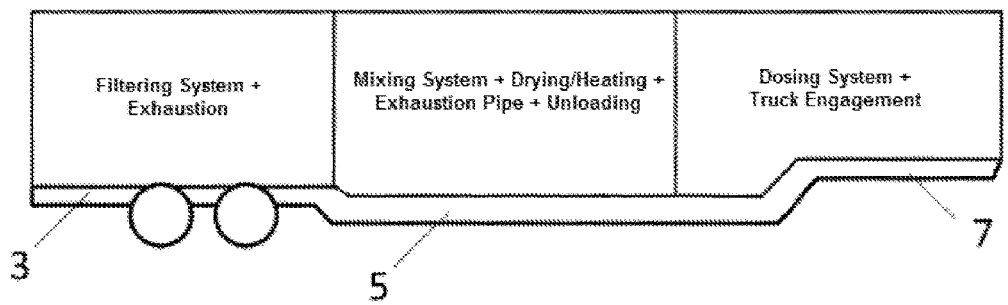
FIG. 4 shows a side view of the arrangement applied to the chassis for implementation in small and medium-sized plants.
Figure 5:
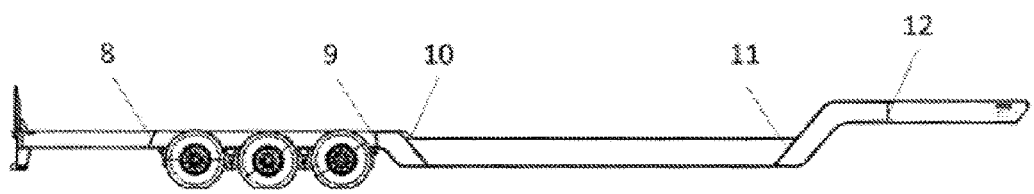
FIG. 5 shows a side view of the joining sites between the subdivided segments of the plant chassis.

Just as in the arrangement of large plants, FIG. 4 shows the arrangement of the systems described applied to small and medium-sized plants. In these cases, the rear segment (3) comprises the filtration and gas exhaust system. The center segment (5) will also accommodate the same systems used in large plants comprising: the mixing system, the drying/heating system, the gas exhaust duct and the unloading of the mix. However, different to large plants, the front segment (7) of the small and medium-sized plants contain the dosage system and the king pin region. So a comparison of the two formats reveals only minor alterations in the rear region (3) and in the center segment (5) in the layouts of the chassis, which need to have their dimensions changed based on altering the size of the equipment.

Figure 6:
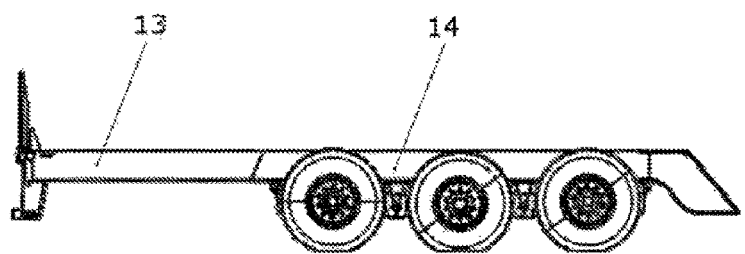
FIG. 6 represents the subdivision into two segments of the region in which the filtration system and the exhaust equipment of the combustion gases and water vapor will be accommodated.

Thereafter, with a view to achieving the desired modularization, the rear region (3), in which the chassis frame is also installed, has been divided into two parts (13)(14), as noted in FIG. 6. In this segmentation, the beam on the towing axles (14) will be identical in any equipment manufactured, being used in small, medium and large-sized mobile plants. The need and the length of an extension beam (13) will depend exclusively on the increase in size of the equipment to be manufactured. In mobile plants with similar production rate, it is possible to standardize this extension beam (13) or the entire back segment (3) from the larger plant. So that the use of standardization of the extension beam (13), proposed above, is possible, it is necessary that the suspension system coupled to the towing axles of the vehicle chassis be fastened by screws.

As described above, the front segment (7) of the chassis should necessarily accommodate the king pin for transporting the asphalt plant and, for small and medium-sized plants, should also house the dosage system. In large-sized plants, the dosage system is installed in an independent and exclusive mobility, and it may also participate in the segmentation and standardization process, seeking an even greater increment in standardization gains. The segment (7) should always be the same, without altering size or shape, regardless of the mobile asphalt plant manufactured.

The center segment (5) of the chassis, as well as the beam on the towing axles (13), will be responsible for incrementing or reducing the final size of the equipment. Both the center segment (5) and the beam on the towing axles (13) will increase or decrease its final length by altering the size of the plant. For example, large equipment will require a larger drying system, so the center segment (5) should increase in relation to a small-sized plant. The same occurs for the beam on the towing axles (13) in relation to the filtration system. Accordingly, the center segment (5) responsible for accommodating the mixing system, the drying/heating system, the gas exhaust duct and the unloading system of the hot mix asphalt should change according to the size of the equipment. Since this region houses the greatest loadings present in the chassis structure, any attempt at segmentation with a view to modularization could structurally compromise the entire equipment. Nonetheless, in mobile plants with similar nominal production, it is possible to use the same segment from the larger plant.

It is important to emphasize that the drawings and description do not have the weight of limiting the embodiments of the inventive concept now proposed, but rather to illustrate and render comprehensible the conceptual innovations disclosed in this utility model. Therefore, the descriptions and pictures should be interpreted illustratively as opposed to limitatively, as there may be other equivalent or similar ways of embodying the inventive concept now disclosed and that stray from the scope of protection delineated in the solution proposed.

The present specification of a solution consists of a modularization applied to a chassis of mobile asphalt plants, endowed with novelty, inventive step, descriptive sufficiency [full disclosure], and industrial application and consequently complies with all the essential requirements for the grant of the privilege claimed.

The invention claimed is:

1. A chassis configured for use with mobile asphalt plants comprising:
 a pair of identical main structures, wherein each main structure is segmented into three regions comprising:
  a rear segment, wherein the rear segment further comprises:
   a plurality of towing axles with a beam located on the towing axles having a suspension system; and
   an extension beam;
  a center segment; and
  a front segment;
  a rear transition, wherein the rear transition joins the rear segment to the center segment; and
  a front transition, wherein the front transition joins the center segment to the front segment;
 wherein the rear segment contains a filtration system and a gas exhaust equipment, the center segment contains a mixing, drying/heating, gas exhaust duct and unloading systems and the front segment contains kingpin region.

2. The chassis configured for use with mobile asphalt plants of claim 1 wherein the front segment further comprises a dosing system in small and medium-sized plants.

3. The chassis configured for use with mobile asphalt plants of claim 2, wherein the beam of the towing axles has a fixed length and the extension beam has a length standardized according to the size of a plant, and the center segment is standardized according to the plant, and the front segment has a fixed length.

* * * * *